(12) United States Patent
Muirhead

(10) Patent No.: US 8,488,556 B2
(45) Date of Patent: Jul. 16, 2013

(54) SYSTEM FOR VOICE AND/OR DATA COMMUNICATION

(75) Inventor: Andrew Muirhead, Norderstedt (DE)

(73) Assignee: Lufthansa Technik AG, Hamburg (DE)

( * ) Notice: Subject to any disclaimer, the term of this patent is extended or adjusted under 35 U.S.C. 154(b) by 333 days.

(21) Appl. No.: 12/718,575

(22) Filed: Mar. 5, 2010

(65) Prior Publication Data
US 2011/0142018 A1  Jun. 16, 2011

(30) Foreign Application Priority Data
Mar. 9, 2009  (DE) .......................... 10 2009 012 721

(51) Int. Cl.
*H04W 4/00* (2009.01)

(52) U.S. Cl.
USPC ................. 370/331; 455/431; 379/211.02

(58) Field of Classification Search
CPC ....................................................... H04W 4/00
USPC .......................................... 370/331; 455/431
See application file for complete search history.

(56) References Cited

U.S. PATENT DOCUMENTS

| 6,321,084 B1 | 11/2001 | Horrer |
| 6,754,489 B1 | 6/2004 | Roux |
| 7,123,905 B1 | 10/2006 | Allaway et al. |
| 2002/0019229 A1* | 2/2002 | Usher et al. ................... 455/435 |
| 2003/0144014 A1* | 7/2003 | Kumhyr ........................ 455/465 |
| 2006/0128366 A1* | 6/2006 | Zhao et al. ................... 455/417 |
| 2007/0161400 A1* | 7/2007 | Sharp et al. ................ 455/550.1 |
| 2007/0195800 A1* | 8/2007 | Yang et al. ................... 370/401 |

FOREIGN PATENT DOCUMENTS

| DE | 19753228 | 6/1999 |
| EP | 0920147 | 11/1998 |
| EP | 1096699 | 10/2008 |
| WO | WO 2005/041445 | 5/2005 |

OTHER PUBLICATIONS

English Abstract of EP092017, retrieved Mar. 25, 2013, 1 page.

* cited by examiner

*Primary Examiner* — Ayaz Sheikh
*Assistant Examiner* — Tarell Hampton
(74) *Attorney, Agent, or Firm* — Casimir Jones, S.C.

(57) ABSTRACT

The invention relates to a system for speech and/or data communication between a mobile telephone on board an aircraft and terminals in communication networks outside the aircraft. The invention allows communication with third parties on the ground during a flight, with calls handled in a manner that is largely or completely automatic for the user of the mobile telephone, such that the user can use his mobile telephone just as well as if he were in the area of his home network on the ground. The communication is handled directly via the satellite communication path between the aircraft and the ground, bypassing the mobile radio operator with whom the user of the mobile telephone has completed a contract.

17 Claims, 2 Drawing Sheets

SYSTEM FOR VOICE AND/OR DATA COMMUNICATION

This application claims the benefit of German Application No.: 10 2009 012 721.6, filed Mar. 9, 2009, which is incorporated herein by reference in its entirety.

The invention relates to a system for speech and/or data communication between a mobile telephone on board an aircraft and terminals in communication networks outside the aircraft.

Fundamentally, it is technically possible to use mobile telephones on board an aircraft. WO 2005/041445 A1 describes a system in which a GSM pico cell is set up on board the aircraft, and a mobile telephone can log into this pico cell. A connection to a GSM telephone network on the ground is made via a satellite link which uses the IP data protocol.

The invention is based on the object of providing a system of the type mentioned initially, which allows simple and cost-effective communication between a mobile telephone on board an aircraft, and terminals on the ground.

The system according to the invention has:
a) on board the aircraft:
   i. a wireless communication network for communication with the mobile telephone,
   ii. a communication server, with which telephone numbers which can be dialled from outside the aircraft are associated,
   iii. transmitting/receiving devices for communication with a ground communication network;
b) an association server, which can be arranged on board the aircraft or stationary and is designed to associate a telephone number, which can be dialled from outside the aircraft, of the communication server with a mobile telephone number;
c) in the mobile telephone, an application having the following features:
   i. the application allows the user of the mobile telephone to select the aircraft and/or flight in which/on which he wishes to use the mobile telephone,
   ii. the application is designed to notify the association server of this selection,
   iii. it is designed to receive a telephone number, which is allocated by the association server and can be dialled from outside the aircraft, of the communication server,
   iv. it is designed to activate call diversion from the mobile telephone number to the telephone number, which is allocated by the association server and can be dialled from outside the aircraft, of the communication server, as soon as the mobile telephone is on board the aircraft in the area of the wireless communication network of this aircraft for communication with the mobile telephone.

First of all, a number of the terms used for the purposes of the invention will be explained. The term mobile telephone refers to any mobile speech and/or data communication device which can be dialled from other communication terminals by means of a telephone number. This covers, in particular, conventional mobile telephones or so-called PDAs (Personal Digital Assistants).

Terminals in communication networks outside the aircraft are other mobile telephones, landline telephones or corresponding dialable communication terminals in networks, in particular landline or mobile telephone networks, outside the aircraft.

A wireless communication network for communication with the mobile telephone is provided on board the aircraft. In particular this may comprise a local cell of a suitable mobile telephone network, for example a GSM or UMTS pico cell. Alternatively, it may be a wireless communication network which communicates in accordance with other data protocols, such as the IP protocol, in particular a WLAN.

Furthermore, a communication server is arranged on board the aircraft, with which telephone numbers which can be dialled from outside the aircraft are associated. This is a data processing device which handles the communication between terminals on board the aircraft and ground communication networks. This communication server can contact terminals on board the aircraft in response to the communication requests, such as telephone calls, from telephone numbers which can be dialled externally.

Furthermore, transmitting/receiving devices for communication with a ground communication network are provided on board the aircraft. These are preferably suitable installations, which are known fundamentally from the prior art, for data communication via satellite networks.

A so-called association server is optionally arranged on board the aircraft or outside it (in particular stationary on the ground). This stores an association table, in which one or more mobile telephone numbers can be allocated to one or more telephone numbers, which can be dialled from outside the aircraft, of the communication server. The association server may be part of the communication server, or else, for example, it can be provided by the aircraft operator, by the satellite communication network operator, or by a mobile telephone network operator. By way of example, for the purposes of the invention, it is also possible for the association table to be created in a stationary association server, to be transmitted to a second association server or to the communication server on board the aircraft, and for this table to be reflected there.

An application which allows specific operation and/or control of the mobile telephone is stored in the mobile telephone. The application allows the user of the mobile telephone to select the aircraft or the flight in which or on which he wishes to use the mobile telephone. If, for example, the user has chartered a so-called business jet, he can enter its aircraft number in the mobile telephone. If he is using a commercial airline flight, he can identify this by means of the flight number. The selection or input of the aircraft or flight number is not restricted to a manual input, and instead of this the operator of the aircraft can, for example, also transmit a data message, such as an SMS, with the corresponding identification number of the aircraft or flight, to the user of the mobile telephone.

As soon as an appropriate selection has been made, the application can notify the association server of this selection. In this case, for notification, the application uses the communication capabilities of the mobile telephone and, for example, can carry out this notification by means of an automatically transmitted SMS, MMS or e-mail.

The association server receives this notification and associates a telephone number, which can be dialled from outside the aircraft, of the communication server of the corresponding aircraft with the mobile telephone number. The corresponding association table is therefore used to store the fact that the mobile telephone number has been allocated to one of the telephone numbers of the communication server. The allocation preferably takes place for a time period which corresponds to the intended time period of the flight to be carried out or possibly also only a fraction thereof. As will be described in more detail below, this allows the mobile telephone to be dialled from outside during the flight, or during a corresponding partial time period of the flight, using the associated telephone number of the communication server.

The telephone number, which is allocated by the association server and can be dialled, of the communication server is signalled to the mobile telephone or to its application, once again preferably by means of a data message such as SMS, MMS or e-mail. The mobile telephone or the application can at this time already prepare for call diversion from the mobile telephone number to the associated telephone number of the communication server, without having to activate this at this time. When the user goes on board the aircraft, call diversion is set up from the mobile telephone number to the telephone number, which is allocated by the association server and can be dialled from outside the aircraft, of the communication server, or this correspondingly already prepared call diversion is activated. After the activation of this call diversion, any call from a third party to that mobile telephone number is diverted to the telephone number of the communication server, even in the mobile radio network of the network operator with which the user has concluded a contract relating to the use of the mobile telephone.

If the mobile telephone number is called by a third party after this activation of call diversion, then the procedure is as follows:

The call is actually diverted in the so-called home network of the mobile telephone, by means of the switched call diversion, to the telephone number of the communication server. The communication server is therefore dialled via the satellite link. The incoming call to the corresponding telephone number of the communication server can be associated with a mobile telephone number by means of the association table of the association server. The communication server on board the aircraft passes this incoming call via the wireless communication network on board the aircraft to the appropriate mobile telephone.

Conversely, if the user of the mobile telephone wishes to make a call to a third party outside the aircraft during the flight, he dials the telephone number of this third party in the normal manner. This call is passed to the appropriate ground communication network via the wireless communication network on board the aircraft, the communication server and the satellite link. During this active call to the exterior, the infrastructure of the so-called home network of the mobile telephone user or the infrastructure of so-called roaming networks (other mobile radio networks with whose operators the operator of the home network has concluded contracts for the capability for use by its customers) is unused. The call is handled completely via the communication infrastructure of the wireless network on board the aircraft, and the satellite link is set up directly to the appropriate dialled communication network on the ground.

In this context, it is preferable that the so-called mapping of the mobile telephone number in this case takes place to the communication server telephone number which is used to handle the call. This means that the telephone number of the mobile telephone (preferably using the association table in the association server) is passed to the called third party, and appears in the so-called caller identification. The third party being called can in this way not identify that the call has come via the communication server in the aircraft and instead of this he sees the telephone number of the calling mobile telephone.

In the same way as that described above for telephone calls, data messages such as SMS, MMS, e-mail or faxes can be sent and received during the flight.

The wireless communication, which preferably takes place via a satellite network, between the aircraft and the ground preferably uses a suitable data protocol, such as the IP protocol. The communication server on board the aircraft can accordingly be designed for so-called IP telephony.

As described above, call diversion must take place from the mobile telephone number to the associated telephone number of the communication server in order that the user of the mobile telephone can be accessed via this telephone number of the communication server during the flight. It is possible for this call diversion to be carried out manually by the user, as soon as he enters the aircraft. Alternatively, the call diversion can be carried out automatically, for example initiated by the mobile telephone logging into the wireless communication network in the aircraft. In this case, for example, the call diversion can be activated by the mobile telephone application, by the aircraft communication server, or by the association server.

After the flight has been completed, this call diversion must be deactivated in order that the mobile telephone user can once again be accessed directly via his mobile telephone number. This deactivation can also be carried out manually, or alternatively automatic deactivation can once again be provided, once the mobile telephone has logged out from the wireless communication network in the aircraft or has logged into a stationary mobile radio network again (the home network or a roaming network). The end of call diversion can once again be initiated directly by the mobile telephone or the corresponding application; alternatively, it is possible, for example, for the communication server and/or the association server to directly initiate this ending of the call diversion once the mobile telephone has logged out of the wireless communication network in the aircraft and, for example, a predetermined time period, for example of a few minutes, has passed. This deactivation of call diversion can once again be carried out by means of suitable data messages such as SMS, MMS or e-mail.

The subject matter of the invention is, furthermore, a method for setting up a speech and/or data communication capability between a mobile telephone on board an aircraft and terminals in communication networks outside the aircraft, using a system according to the invention. The method has the following steps:

a. Selection of the aircraft and/or flight in which/on which the user of the mobile telephone wishes to use the mobile telephone, by means of the application of the mobile telephone;

b. Notification of the association server of this selection by means of the application;

c. Association of a telephone number, which can be dialled from outside the aircraft, of the communication server for the aircraft with the mobile telephone, and transmission of this telephone number to the application of the mobile telephone (1);

d. Activation of call diversion from the mobile telephone number to the telephone number, which is allocated by the association server and can be dialled from outside the aircraft, of the communication server, as soon as the mobile telephone is on board the aircraft in the area of the wireless communication network of this aircraft for communication with the mobile telephone.

Preferred method variants, which have already been described above in conjunction with the explanation of the system, are specified in dependent Claims 11 to 15.

The invention allows communication, which is handled largely or completely automatically for the user of the mobile telephone, with third parties on the ground during a flight. In this case, he can use his mobile telephone just as well as if he were in the area of his home network on the ground. As a result of the communication being handled directly via the satellite communication path between the aircraft and the ground, bypassing the mobile radio operator with whom the user of the mobile telephone has completed a contract, the communication is cost-effective, since it avoids any roaming fees for the use of other mobile radio networks. Although the mobile telephone is not logged in either in the home network of the mobile radio operator or in a contractually bound roaming network of a third mobile radio operator during the flight, the switched call diversion to the telephone number of the communication server allows dialling to take place as if the mobile telephone were in the home network. Costs are therefore incurred exclusively for use of the satellite communication link between the aircraft and the ground and, in some circumstances, for passing on the call on the ground in the normal way.

Therefore, during the flight, the mobile telephone user uses his telephone in a cost-effective manner outside the actually provided communication infrastructure (home mobile radio network or corresponding roaming networks); however, the mobile telephone is, so to speak, virtually mapped for third parties communicating with it by means of the call diversion carried out by means of the association table of the association server.

The large-scale or complete automation of the described procedures by means of the communication server, association server and the application in the mobile telephone makes it possible for the user and third parties communicating with him to communicate with one another in the normal manner during the flight without any of the subscribers to this communication process needing to have any idea of where the user of the mobile telephone is currently located, and specifically how he can be accessed.

One exemplary embodiment of the invention will be explained in the following text with reference to the drawings, in which, illustrated schematically:

Figure 1:
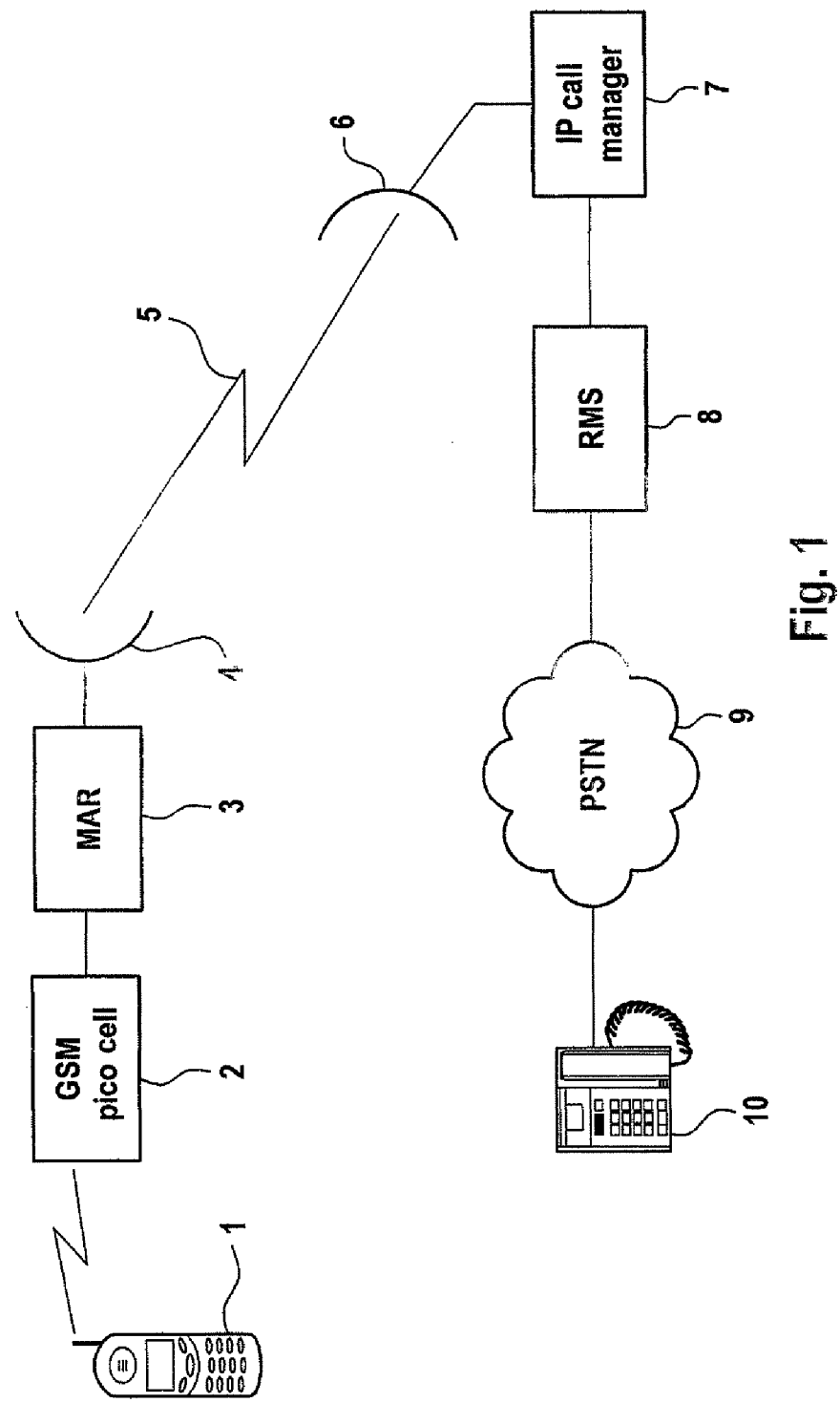
FIG. 1 shows the communication between a mobile telephone on board an aircraft and a stationary telephone on the ground by means of the system according to the invention.

FIG. 1 shows a mobile telephone 1 which is wirelessly connected to a GSM pico cell 2 on board an aircraft. This aircraft is in cruising flight. The GSM pico cell 2 communicates with a communication server 3 on board the aircraft, which is also referred to as a mobile access router (MAR). By way of example, the communication can take place via an Intranet on board the aircraft (cable-based or wirelessly) by means of the IP protocol. The communication server 3 communicates via an antenna 4 and a wireless connection (preferably a satellite link), which is indicated schematically by 5, with an antenna 6 on the ground, which passes on the data stream via a so-called IP call manager 7. The communication data "filtered" out of the IP data stream by means of the IP call manager 7 is passed via the association server 8 (remote monitoring server, RMS) to the public telephone network 9 (PSTN, Public Switched Telephone Network), to which the stationary communication subscriber 10 is connected.

Figure 2:
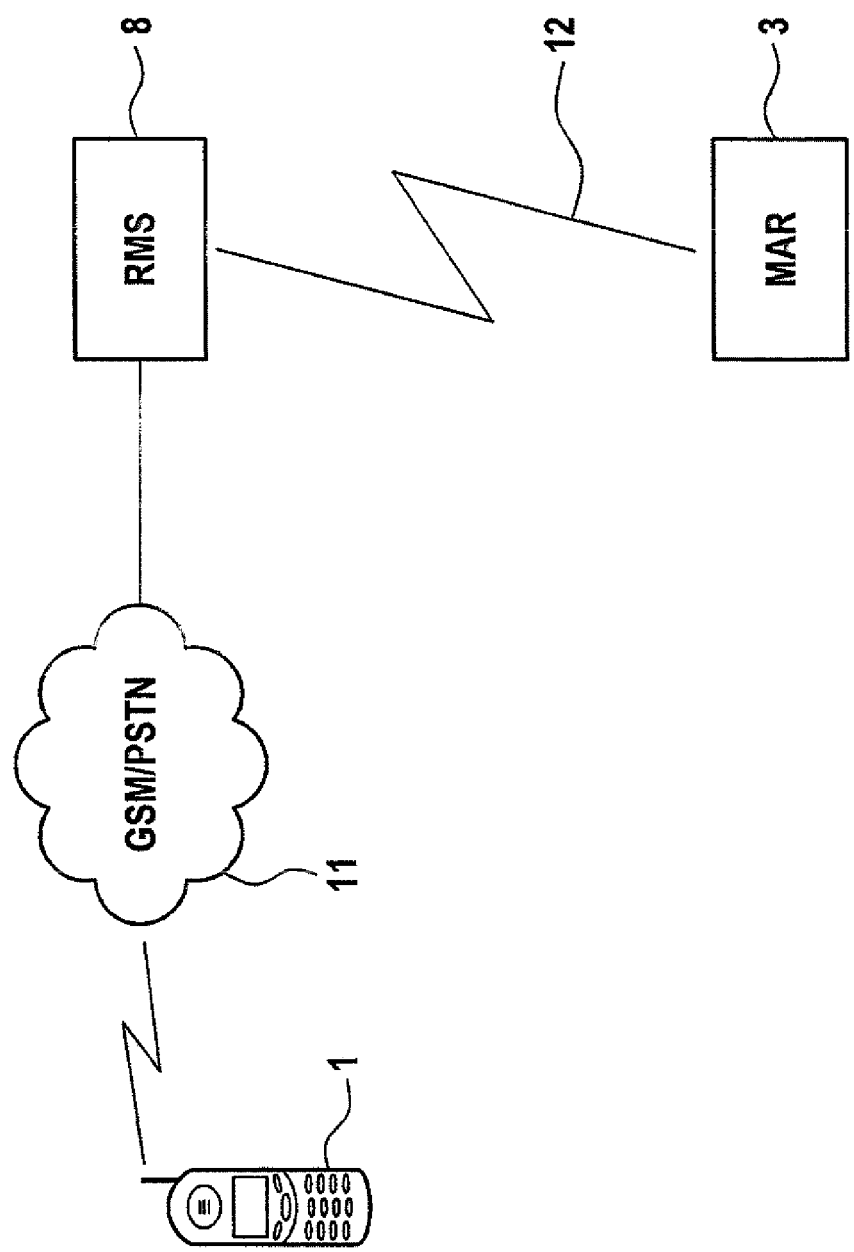
FIG. 2 shows the communication between a mobile telephone and the association server for allocation of a telephone number, which can be dialled from outside the aircraft, of the communication server before a flight.

FIG. 2 shows schematically how the mobile telephone 1 located on the ground is linked via a public mobile radio network, which is indicated schematically at 11, with the association server 8, which in turn communicates with the communication server 3 in the aircraft via a preferably wireless link 12. In this case, the link 12 may be identical to the satellite link 5 illustrated in FIG. 1; it may optionally be a different link, for example a wireless link or cable-based link to the aircraft parked at the gate.

The system according to the invention operates as follows. Before the user of the mobile telephone 1 enters a flight on which he wishes to use his mobile telephone, he activates the application installed in the mobile telephone and enters the flight number and/or aircraft number. The application sends this information via the telephone network 11 to the association server 8, which is in this way informed of the intended use of the mobile telephone 1 on a specific flight. This notification is sent by SMS or e-mail in the exemplary embodiment.

The association server 8 communicates with the communication server 3 by means of the link 12 and causes a telephone number, which can be dialled from outside, of the communication server 3 to be allocated to the telephone number of the mobile telephone 1. This association is stored in an appropriate association table in the association server 8. The association in the table is stored at least over a time period until the intended flight has been carried out.

The association server 8 notifies the mobile telephone 1 or its application of the allocation that has been carried out. This is once again done by means of an electronic message, such as an SMS or e-mail. The application in the mobile telephone 1 prepares a call diversion from the mobile telephone number to the associated number of the communication server 3, without having to activate this.

When the user of the mobile telephone 1 enters the flight and goes on board the aircraft, the mobile telephone 1 comes within range of the GSM pico cell 2. At this time, the call diversion from the mobile telephone number to the associated number of the communication server 3 can be activated. This activation of the call diversion can be initiated manually by the user of the mobile telephone 1, for example before he enters the aircraft. It is likewise possible for the call diversion to be initiated automatically.

If the user of the mobile telephone 1 makes a call or sends a message during the flight, the communication path is as illustrated in FIG. 1. In this case, the so-called home mobile radio network in which the user of the mobile telephone 1 has a subscription is generally completely bypassed. There is just as little need to use, for example, roaming mobile radio networks for communication in countries which the aircraft is currently overflying. Instead of this, the communication is handled completely by means of the infrastructure shown in FIG. 1. In this case, it is possible for the ground elements of the system, such as the illustrated IP call manager 7, the association server 8 etc, to be physically separated from one another, and to be linked by suitable networks, such as the Internet.

If a subscriber on the ground calls the telephone number of the mobile telephone 1 during the flight, because of the switched call diversion from the home network operator of the user of the mobile telephone 1, this call to the mobile telephone number is immediately diverted to the telephone number, allocated by the association server 8, of the communication server 3. The communication server 3 then passes on the call in the aircraft by means of the GSM pico cell 2 to the mobile telephone 1, as a result of which the mobile telephone 1 can accept the call.

Messages can also be sent in the same way as that described above for telephone calls.

So-called mapping of the number of the mobile telephone 1 onto the associated number of the communication server 3 preferably takes place by means of the association server 8, as a result of which the subscriber 10 sees the mobile radio number of the mobile telephone 1 on his display during the telephone call.

When the user of the mobile telephone 1 leaves the aircraft, with his mobile telephone, after completion of the flight, and therefore leaves the area of the GSM pico cell 2 and logs into the home network of the mobile telephone 1 or a stationary roaming network, the call diversion is deactivated again. The technical options for carrying out this deactivation are explained in detail in the general part of the description.

The invention claimed is:

1. System for speech, data, or speech and data communication between a mobile telephone (1) on board an aircraft and terminals (1) in communication networks outside the aircraft, characterized in that the system has:
   a) on board the aircraft:
      i) a wireless communication network (2) for communication with the mobile telephone (1),
      ii) a communication server (3), with which telephone numbers which can be dialled from outside the aircraft are associated,
      iii) devices that transmit and receive (4) for communication with a ground communication network;
   b) an association server (8), which can be arranged on board the aircraft or stationary and is designed to associate a telephone number, which can be dialled from outside the aircraft, of the communication server (3) with a mobile telephone number;
   c) in the mobile telephone (1), an application having the following features:
      i) the application allows the user of the mobile telephone (1) to select the aircraft, flight aircraft and flight in on which the user wishes to use the mobile telephone (1),
      ii) the application is designed to notify the association server (8) of this selection,
      iii) the application is designed to receive a telephone number, which is allocated by the association server (8) and can be dialled from outside the aircraft, of the communication server (3),
      iv) the application is designed to activate call diversion from the mobile telephone to the telephone number, which is allocated by the association server (8) and can be dialled from outside the aircraft, of the communication server (3), as soon as the mobile telephone (1) is on board the aircraft in the area of the wireless communication network (2) of this aircraft for communication with the mobile telephone (1).

2. System according to claim 1, characterized in that the wireless communication network (2) for communication with the mobile telephone on board the aircraft is a GSM network or IP network, in particular a WLAN.

3. System according to claim 1, characterized in that the devices that transmit and receive (3) on board the aircraft for communication with a ground communication network are designed for IP data communication.

4. System according to claim 1, characterized in that the communication server (3) is designed for IP telephony.

5. System according to claim 1, characterized in that one or both of the notification according to feature c) ii) and the reception according to feature c) iii) of claim 1 are carried out by means of a data message.

6. System according to claim 1, characterized in that the activation of call diversion according to feature c) iv) of claim 1 is carried out manually by the user of the mobile telephone (1).

7. System according to claim 1, characterized in that the activation of the call diversion according to feature c) iv) of claim 1 is carried out automatically once the mobile telephone has logged into the wireless communication network (2) in the aircraft.

8. System according to claim 1, characterized in that the application of mobile telephone (1) is designed for deactivation of call diversion once the mobile telephone (1) has logged out from the wireless communication network (2) in the aircraft or has logged into the stationary mobile radio network again.

9. System according to claim 8, characterized in that the deactivation can be initiated by a data message from the communication server (3) or association server (8) to the mobile telephone (1).

10. Method for setting up a speech, data, or speech and data communication capability between a mobile telephone (1) on board an aircraft and terminals (10) in communication networks outside the aircraft, using a system according to claim 1, characterized by the following steps:
    a) Selection of the aircraft, flight or aircraft and flight on which the user of the mobile telephone wishes to use the mobile telephone (1), by means of the application of the mobile telephone (1);
    b) Notification of the association server (8) of this selection by means of the application;
    c) Association of a telephone number, which can be dialled from outside the aircraft, of the communication server (3) for the aircraft with the mobile telephone (1), and transmission of this telephone number to the application of the mobile telephone (1);
    d) Activation of call diversion from the mobile telephone number to the telephone number, which is allocated by the association server (8) and can be dialled from outside the aircraft, of the communication server (3), as soon as the mobile telephone (1) is on board the aircraft in the area of the wireless communication network of this aircraft for communication with the mobile telephone (1).

11. Method according to claim 10, characterized in that the transmission of the telephone number, which can be dialled from outside the aircraft, of the communication server (3) to the application of the mobile telephone (1) is carried out by means of a data message.

12. Method according to claim 10 or 11, characterized in that the activation of call diversion from the mobile telephone number to the telephone number, which is allocated by the association server (8) and can be dialled from outside the aircraft, of the communication server (3) is carried out manually by the user of the mobile telephone (1).

13. Method according to claim 10 or 11, characterized in that the activation of call diversion from the mobile telephone number to the telephone number, which is allocated by the association server and can be dialled from outside the aircraft, of the communication server (3) is carried out automatically once the mobile telephone (1) has logged into the wireless communication network (2) in the aircraft.

14. Method according to claim 1, characterized in that the application of the mobile telephone (1) deactivates the call diversion once the mobile telephone (1) has logged out from the wireless communication network (2) in the aircraft or has logged into a stationary mobile radio network again.

15. Method according to claim 14, characterized in that the deactivation is initiated by a data message from the communication server (3) or association server (8) or the mobile telephone (1).

16. System according to claim 5, characterized in that the data message comprises one or more of an SMS message, an MMS message, and an email message.

17. Method according to claim 11, characterized in that the data message comprises one or more of an SMS message, an MMS message, and an email message.

* * * * *